(12) United States Patent
Unverricht et al.

(10) Patent No.: US 11,536,182 B2
(45) Date of Patent: Dec. 27, 2022

(54) METHOD AND PROCESSING UNIT FOR ASCERTAINING A CATALYTIC CONVERTER STATE

(71) Applicant: Robert Bosch GmbH, Stuttgart (DE)

(72) Inventors: Maik Unverricht, Rutesheim (DE);
Bernd Kraewer, Winnenden (DE);
Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/227,493

(22) Filed: Apr. 12, 2021

(65) Prior Publication Data
US 2021/0324779 A1  Oct. 21, 2021

(30) Foreign Application Priority Data
Apr. 16, 2020  (DE) .................... 10 2020 204 809.6

(51) Int. Cl.
*F01N 9/00*  (2006.01)
*F01N 11/00*  (2006.01)

(52) U.S. Cl.
CPC ............ *F01N 9/005* (2013.01); *F01N 11/007* (2013.01); *F01N 2390/02* (2013.01); *F01N 2550/02* (2013.01); *F01N 2560/025* (2013.01); *F01N 2900/0408* (2013.01); *F01N 2900/1411* (2013.01); *F01N 2900/1624* (2013.01)

(58) Field of Classification Search
CPC .............. F01N 11/007; F01N 2390/02; F01N 2550/02; F01N 2560/025; F01N 2900/0408; F01N 2900/1411; F01N 2900/1624; F01N 9/005
See application file for complete search history.

(56) References Cited

U.S. PATENT DOCUMENTS

| | | | |
|---|---|---|---|
| 8,813,479 B2 * | 8/2014 | Geyer | F01N 9/002 60/311 |
| 2002/0029561 A1 * | 3/2002 | Ueno | F01N 11/007 60/285 |
| 2003/0017603 A1 * | 1/2003 | Uchida | F02D 41/22 436/127 |

(Continued)

FOREIGN PATENT DOCUMENTS

| | | |
|---|---|---|
| DE | 102011111354 A1 | 3/2012 |
| DE | 102014013690 A1 | 3/2015 |

(Continued)

*Primary Examiner* — Anthony Ayala Delgado
(74) *Attorney, Agent, or Firm* — Michael Best & Friedrich LLP

(57) ABSTRACT

A method (200) for ascertaining a catalytic converter state is proposed, wherein an exhaust-gas catalytic converter (130) is monitored on the basis of a catalytic converter model. Here, the catalytic converter model is adapted (250) in a manner dependent on measured values detected by means of one or more sensors (145, 147), wherein a frequency and/or a degree of the adaptation of the catalytic converter model is detected (260). The catalytic converter state is ascertained (270) as non-critical if the frequency and/or the degree of the adaptation do not exceed a predeterminable threshold value or is ascertained (270) as critical if the frequency and/or the degree of the adaptation exceed the predeterminable threshold value.

9 Claims, 1 Drawing Sheet

(56) References Cited

U.S. PATENT DOCUMENTS

| | | | | |
|---|---|---|---|---|
| 2008/0306673 | A1* | 12/2008 | Yasui | F01N 9/00 60/276 |
| 2015/0204258 | A1* | 7/2015 | Kumar | F02D 41/1456 60/274 |
| 2016/0251996 | A1* | 9/2016 | Kano | F01N 11/007 73/114.75 |
| 2017/0089280 | A1* | 3/2017 | Santillo | F02D 41/0085 |

FOREIGN PATENT DOCUMENTS

| | | |
|---|---|---|
| DE | 102016222418 A1 | 5/2018 |
| JP | 2004300981 A * | 10/2004 |

* cited by examiner

METHOD AND PROCESSING UNIT FOR ASCERTAINING A CATALYTIC CONVERTER STATE

BACKGROUND OF THE INVENTION

The present invention relates to a method for ascertaining a catalytic converter state and to a processing unit and a computer program for carrying out said method.

Modern motor vehicles are commonly equipped with catalytic converters for the aftertreatment of an exhaust gas of an internal combustion engine. In many cases, these catalytic converters are monitored and/or controlled in closed-loop fashion.

In the case of an incomplete combustion of the air-fuel mixture in an Otto engine, numerous combustion products are emitted aside from nitrogen ($N_2$), carbon dioxide ($CO_2$) and water ($H_2O$), of which combustion products hydrocarbons (HC), carbon monoxide (CO) and nitrogen oxides ($NO_x$) are limited by legislation. The applicable exhaust-gas limit values for motor vehicles can, in the current state of the art, be adhered to only by way of catalytic exhaust-gas aftertreatment. Said pollutant components can be converted through the use of, for example, a three-way catalytic converter.

In three-way catalytic converters, a simultaneously high conversion rate for HC, CO and $NO_x$ is attained only in a narrow lambda range around the stoichiometric operating point (lambda=1), the so-called "catalytic converter window" or "conversion window".

For the operation of the three-way catalytic converter in the conversion window, it is typically the case in modern engine control systems that closed-loop lambda control is used, which is based on the signals of lambda probes arranged upstream and downstream of the three-way catalytic converter. For the closed-loop control of the air ratio lambda, which is a measure for the composition of the fuel/air ratio of the internal combustion engine, the oxygen content of the exhaust gas upstream of the three-way catalytic converter is measured by means of an inlet-side lambda probe arranged there. In a manner dependent on this measured value, the closed-loop control corrects for example the fuel quantity or injection duration, which is predefined in the form of a base value by a pilot control function.

In the context of the pilot control, base values of fuel quantities to be injected are predefined in a manner dependent on, for example, rotational speed and load of the internal combustion engine. For even more exact closed-loop control, the oxygen concentration of the exhaust gas downstream of the three-way catalytic converter may additionally be detected by means of a further lambda probe. The signal of this outlet-side lambda probe can be used for master control, which is superposed on the closed-loop lambda control upstream of the three-way catalytic converter based on the signal of the inlet-side lambda probe. As a lambda probe arranged downstream of the three-way catalytic converter, use is generally made of a two-step lambda probe, which has a very steep characteristic curve at lambda=1 and can therefore indicate lambda=1 very exactly.

Aside from the master control, which generally corrects only small deviations from lambda=1 and which is configured to be relatively slow, another functionality for large deviations from lambda=1, in the form of lambda pilot control, may be provided in order that the conversion window is reached again quickly, which is important for example after overrun cut-off phases, in which the three-way catalytic converter is charged with oxygen. The charging with oxygen impairs the $NO_x$ conversion.

Owing to the oxygen storage capacity of the three-way catalytic converter, lambda=1 may prevail downstream of the three-way catalytic converter for a further several seconds after rich or lean lambda has been set upstream of the three-way catalytic converter. This characteristic of the three-way catalytic converter of temporarily storing oxygen is utilized in order to compensate brief deviations from lambda=1 upstream of the three-way catalytic converter. If lambda not equal to 1 prevails upstream of the three-way catalytic converter for a relatively long period, the same lambda will also take effect downstream of the three-way catalytic converter as soon as, in the case of lambda>1 (excess of oxygen), the oxygen fill level exceeds the oxygen storage capacity, or as soon as, in the case of lambda<1, there is no longer any oxygen stored in the three-way catalytic converter.

At this point in time, a two-step lambda probe downstream of the three-way catalytic converter then also indicates a departure from the conversion window. Up to this point in time, the signal of the lambda probe downstream of the three-way catalytic converter however does not indicate the impending breakthrough, and master control based on this signal therefore often first reacts so late that the fuel metering can no longer react in good time before a breakthrough. As a consequence, increased emissions occur. Such closed-loop control concepts therefore have the disadvantage that they identify a departure from the conversion window, on the basis of the voltage of the two-step lambda probe downstream of the three-way catalytic converter, only at a late point in time.

DE 10 2016 222 418 A1 has disclosed a model-based closed-loop control concept in which in each case one lambda sensor is arranged upstream and downstream of the catalytic converter in a flow direction of the exhaust gas and a catalytic converter model is used to mathematically determine the lambda value that is measured downstream of the catalytic converter. If the actually measured lambda value deviates from the calculated lambda value, the catalytic converter model is adapted. In particular, here, a fill level of the catalytic converter with regard to one or more exhaust-gas components, in particular with regard to oxygen, is modeled.

With progressive aging, the catalytic converter cannot convert the exhaust gas as effectively as in the new state. Therefore, an inspection of the exhaust-gas system during driving operation by the engine controller is usually prescribed by legislation (on-board diagnosis). Here, catalytic converter diagnosis has the task of identifying an inadmissibly large drop in conversion capability, which leads to an inadmissible increase in emissions, and indicating this by way of a control lamp (MIL).

One possibility for active diagnosis of the catalytic converter consists in determining the oxygen storage capacity (OSC) of the catalytic converter, and activating the control lamp in the presence of an excessively low oxygen storage capacity. This is based on the fact that, from experience, with decreasing oxygen storage capacity, the conversion capability of the catalytic converter also decreases. In the case of such an active diagnostic method, the catalytic converter for example firstly has oxygen eliminated from it by means of a rich air-fuel mixture. Subsequently, by means of a lean air-fuel mixture, oxygen is introduced into the catalytic converter, and the introduced oxygen quantity is integrated over time until a lambda probe downstream of the catalytic converter indicates a lean mixture. The integrated oxygen quantity corresponds to the oxygen storage capacity of the catalytic converter. The method is repeated several times if necessary in order to obtain a reliable diagnostic result.

SUMMARY OF THE INVENTION

Against this background, according to the invention, a method for ascertaining a catalytic converter state and a processing unit and a computer program for carrying out said method, having the features of the independent patent claims, are proposed. Advantageous refinements are the subject of the subclaims and of the following description.

A method according to the invention is based on an adaptive catalytic converter model. For example, here, a catalytic converter model may be provided which realizes a multi-stage adaptation, by means of which uncertainties of measured or modeled variables that are input into the system model on which the model is based, and uncertainties of the system model, are compensated.

Such a multi-stage adaptation combines for example continuous, very exact adaptation of relatively small deviations and a discontinuous fast correction of relatively large deviations.

The continuous adaptation and the discontinuous correction may in this case be based on signal values from different signal ranges of a sensor, in particular of a lambda probe which is arranged in the exhaust-gas stream downstream of the catalytic converter and thus at the outlet side, wherein, however, two fundamentally different information items are derived from these signal values. Such a model makes it possible to take into consideration the different significance of the signal values from the different signal ranges with regard to the exhaust-gas composition and with regard to the fill level of the catalytic converter.

Furthermore, multiple signal value ranges may be provided in which the continuous adaptation alone, the discontinuous correction alone, or both together, are active.

In the case of the discontinuous correction, a modeled fill level is corrected in accordance with the actual fill level for example if the voltage of an outlet-side lambda probe indicates a breakthrough of rich or lean exhaust gas downstream of the catalytic converter and thus an excessively low or an excessively high actual oxygen fill level respectively. This correction is performed discontinuously in order to be able to evaluate the reaction of the voltage of the lambda probe downstream of the catalytic converter. Because this reaction occurs with a delay owing to the system dead time and the storage behavior of the catalytic converter, the adaptive catalytic converter model may in particular provide for the correction to be performed in the first instance when the lambda value of the signal of the lambda probe arranged downstream of the catalytic converter allows a conclusion to be drawn regarding the actual oxygen fill level of the catalytic converter.

In the case of the abovementioned continuous adaptation, it is for example the case that the lambda signal of a two-step lambda probe downstream of the catalytic converter is compared with a modeled lambda signal downstream of the catalytic converter. From this comparison, a lambda offset between the lambda value upstream of the catalytic converter and the lambda value downstream of the catalytic converter can be derived. Using the lambda offset, it is for example the case that a lambda setpoint value formed by a pilot controller is corrected.

Model-based closed-loop control of the fill level of a catalytic converter basically has the advantage that an impending departure from the catalytic converter window can be identified earlier than in the case of master control which is based on the signal of an exhaust-gas probe arranged downstream of the catalytic converter. In this way, the departure from the catalytic converter window can be counteracted by means of an early and targeted correction of the air-fuel mixture.

The present invention makes use of the fact that, with progressive aging of a catalytic converter, the oxygen storage capacity and/or conversion capability thereof decreases, and thus an adaptive catalytic converter model must be adapted to an increasing degree or increasingly more often. From an increasing adaptation requirement, it is thus possible to infer aging of the catalytic converter, specifically both in situations in which the storage capacity is decreasing and in situations in which this is not the case. In particular in the latter situations, other methods of catalytic converter diagnosis often fail.

For example, observations in the case of various current catalytic converters, in particular those with high levels of noble metals, indicate that a high oxygen storage capacity is duly necessary but is not adequate for a high conversion capability of a catalytic converter. For example, catalytic converters have been observed which, in the context of the catalytic converter diagnosis, were in order (that is to say exhibited adequately high storage capacity) but gave rise to inadmissible emissions owing to a no longer adequate conversion capability.

Furthermore, aside from the oxygen storage capacity, it is also possible for the storage capacity for other exhaust-gas constituents to be monitored in model-based fashion, for example a storage capacity for nitrogen oxides ($NO_x$). The present invention can also be advantageously used in conjunction with adaptive models of this type.

By means of the invention, catalytic converter diagnosis is made possible without the need for setting operating parameters which are unfavorable from an emissions aspect. With the diagnostic method according to the invention, it is furthermore the case, as already mentioned, that the actual conversion capability is also assessed independently of the storage capacity.

It is accordingly the underlying concept of the present invention to evaluate the adaptation requirement, which has been ascertained for example by means of the above-discussed continuous adaptation and/or discontinuous correction, over a relatively long period, for example several minutes, for example 5 minutes. In particular, the adaptation requirement is a function of the difference between the measured lambda value downstream of the catalytic converter and the modeled lambda value downstream of the catalytic converter, or generally between at least one measured value and at least one model value determined by means of the catalytic converter model.

A lambda offset between the lambda value upstream of the catalytic converter and the lambda value downstream of the catalytic converter (for example owing to an offset error of the lambda probe upstream of the catalytic converter or a leak in the exhaust-gas system) systematically leads to an adaptation requirement which is constant over a relatively long period, that is to say the model must be constantly readjusted to a more or less constant degree.

By contrast, a drop in the conversion capability of the catalytic converter that does not correlate with the oxygen storage capacity of the catalytic converter leads to an adaptation requirement which changes over time. This is because the modeled state variables of the catalytic converter (for example the oxygen fill level in different regions of the catalytic converter or the lambda value at the outlet of the catalytic converter) are calculated by means of reaction kinetics which are dependent on the oxygen storage capacity of the catalytic converter. If the conversion capability of the catalytic converter does not correlate with the oxygen storage capacity, then the modeled reaction kinetics do not correspond with the real reaction kinetics. Likewise, the modeled state variables of the catalytic converter do not correlate with those of the real catalytic converter. In particular, the modeled lambda value at the outlet of the catalytic converter does not correlate with the lambda value measured at the outlet of the catalytic converter by means of the lambda probe. Since the modeled kinetics do not match the real kinetics both for reactions with lean exhaust-gas constituents and for reactions with rich exhaust-gas constituents, there is no resulting systematic deviation of the lambda value downstream of the catalytic converter from lambda=1 as in the case of a lambda offset, but there are resulting breakthroughs of lean exhaust gas and breakthroughs of rich exhaust gas. This has the effect that, in this case, an adaptation requirement alternately in a rich direction and in a lean direction, or at least an adaptation requirement which changes to an increased degree or more frequently in a non-systematic manner, is identified.

Such an exceptional adaptation requirement is identified here through observation of the development of the adaptation or correction requirement of the catalytic converter model.

It is expedient if the observation is performed only if the operating conditions lead to the expectation of reliable adaptation or diagnostic results. In particular, in periods in which the catalytic converter is in an operating state which cannot be replicated with adequate accuracy by the catalytic converter model, observations of a changed adaptation requirement are disregarded or are provided with a lower weighting. Examples for this are operating states with a large change in the load demand, high rates of tank ventilation or high flow transfer rates of air from inlet into outlet valves of the internal combustion engine. It may also be provided that, in such periods, the adaptation requirement is not observed at all, or the observation is activated only in periods in which an adaptation requirement caused predominantly by the actual catalytic converter state can be assumed. For this purpose, it may also be provided that a present operating state of the internal combustion engine is evaluated in order to make a decision regarding an activation of the observation or a weighting of the observed adaptation requirement. If exceptionally large or exceptionally frequent changes in the adaptation requirement are identified during the observation period, this is indicative of the fact that the modeled state variables do not correlate with the real state variables, and that the conversion capability of the catalytic converter is no longer adequately high.

The measured values detected here are advantageously lambda values upstream and/or downstream of the catalytic converter. In many situations, these are detected in any case, such that no additional measurement outlay is generated, and are linked very directly to the function of the catalytic converter, such that this promotes an authoritative diagnosis.

Preferably, the frequency and/or the degree of the adaptation of the catalytic converter model is based on a predetermined exhaust-gas flow rate. In other words, a period in which corresponding adaptations of the catalytic converter model are used for the ascertainment of the catalytic converter state may be relatively short if a high exhaust-gas flow rate is passing through the catalytic converter, whereas the observation period is lengthened in the case of relatively small exhaust-gas volume flows in order to ensure consistent diagnosis quality. The diagnosis can thus be adapted to a present operating point or load state.

Preferably, a warning message is output if a critical catalytic converter state is ascertained. In this way, it is for example possible for legal requirements to be complied with, and a defective or faulty catalytic converter can be promptly exchanged and/or serviced in order to avoid environmentally damaging and/or harmful emissions of pollutants. Such a warning message may be output in particular in the form of an actuation of a warning lamp, of a warning tone and/or as a corresponding fault message in a fault memory of an on-board computer of the motor vehicle.

A processing unit according to the invention, for example a control unit of a motor vehicle, is configured, in particular in terms of programming technology, to carry out a method according to the invention.

The implementation of a method according to the invention in the form of a computer program or computer program product with program code for carrying out all method steps is also advantageous because this entails particularly low costs, in particular if an executing control unit is also utilized for further tasks and is therefore present in any case. Suitable data carriers for the provision of the computer program are in particular magnetic, optical and electrical memories, such as for example hard drives, flash memories, EEPROMs, DVDs and others. A download of a program via computer networks (Internet, Intranet, etc.) is also possible.

The invention will be described here and below on the basis of the example of a three-way catalytic converter, but is analogously also transferable to other catalytic converter types.

BRIEF DESCRIPTION OF THE DRAWINGS

Further advantages and configurations of the invention will emerge from the description and the appended drawing.

The invention is illustrated schematically in the drawing on the basis of an exemplary embodiment, and will be described below with reference to the drawing.

DETAILED DESCRIPTION

Figure 1:
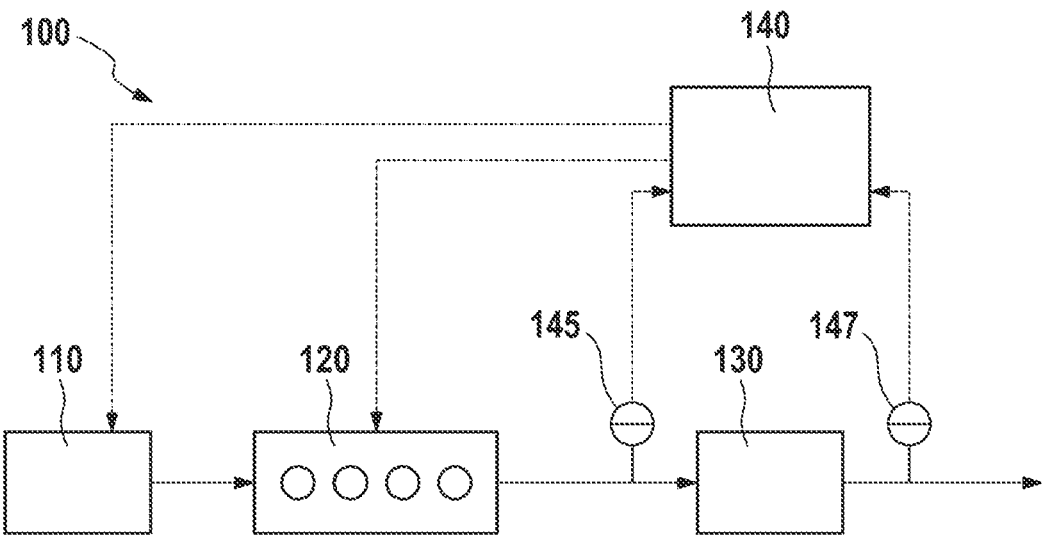
FIG. 1 shows a schematic illustration of a vehicle in which a method according to the invention can be used.

FIG. 1 illustrates, schematically as a block diagram, a vehicle 100 in which a method according to the invention can be used. The vehicle 100 is preferably configured for carrying out a method 200 according to FIG. 2 and has an internal combustion engine 120, for example an Otto engine, a catalytic converter 130 and a processing unit 140. Furthermore, the vehicle 100 may comprise a fuel preparation device 110, for example in the form of injection pump(s), turbocharger(s), etc. or combinations thereof.

Furthermore, a vehicle of said type has (exhaust-gas) sensors 145, 147, in particular lambda probes, which are arranged upstream and downstream of the catalytic converter 130 in an exhaust-gas system of the vehicle 100.

The processing unit controls inter alia the operation of the internal combustion engine 120, for example through the control of ignition times, valve opening times and composition, flow rate and/or pressure of the fuel-air mixture provided by the fuel preparation device 110.

Exhaust gas that is generated during the operation of the internal combustion engine 120 is fed to the catalytic converter 130. Upstream of the catalytic converter 130, the air ratio lambda of the exhaust gas is measured by means of a first lambda probe 145, and this first lambda value is transmitted to the processing unit 140. Reactions of exhaust-gas constituents with one another are accelerated, or made possible in the first place, by the catalytic converter, such that harmful constituents, such as for example carbon monoxide, nitrogen oxides and incompletely burned hydrocarbons, are converted into relatively non-harmful products such as water vapor, nitrogen and carbon dioxide. Downstream of the catalytic converter 130, a second lambda value is ascertained by means of a second lambda probe 147 and transmitted to the processing unit 140.

The first and the second lambda value may temporarily or permanently deviate from one another because, as a result of the reactions in the catalytic converter 130, the compositions of the exhaust gas upstream and downstream of the catalytic converter 130 deviate from one another. Furthermore, the exhaust gas requires a certain time to flow through the catalytic converter 130 (so-called dead time). This dead time is in particular dependent on a present volume flow of the exhaust gas, that is to say on a present operating state of the internal combustion engine 120. For example, during operation of the internal combustion engine 120, a higher exhaust-gas quantity is produced per unit of time at full load than during idling operation. The respective dead time thus changes in a manner dependent on the operating state of the internal combustion engine 120, because the volume of the catalytic converter 130 is constant.

Figure 2:
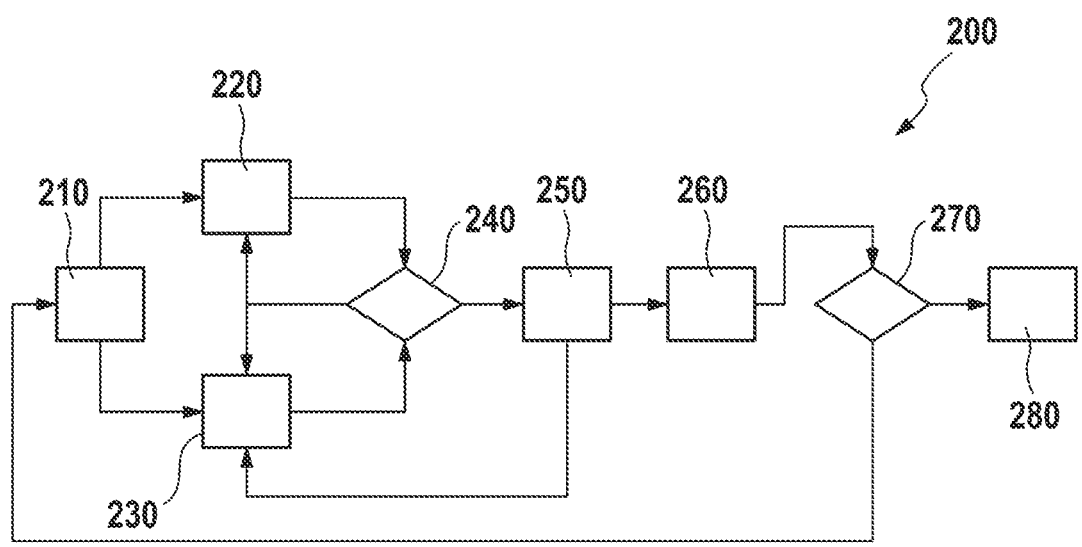
FIG. 2 shows an advantageous configuration of a method according to the invention in the form of a flow diagram.

The processing unit 140 is advantageously configured to carry out the method 200 according to a preferred embodiment of the invention, which is illustrated in FIG. 2. For this purpose, after an initialization step 210, a first and a second lambda value are measured by means of the lambda probes 145, 147 upstream and downstream of the catalytic converter 130 in a first step 220.

In parallel with this, in a step 230, a lambda value of the exhaust gas downstream of the catalytic converter 130 is calculated, in a manner dependent on the present operating state of the internal combustion engine 120 and in particular on the first lambda value, by means of a system model.

In a further step 240, the calculated lambda value is compared by the processing unit 140 with the second lambda value measured by the lambda probe 147.

If the measured value substantially corresponds to the calculated value, the method returns to the steps 220 and 230 and continues the calculation by means of the system model and the measurement of first and second lambda values.

However, if the values do not correspond to one another, which may be characterized in particular by the fact that an absolute value of the difference between calculated and measured values exceeds a predetermined threshold value, the system model is adapted in a step 250. After such an adaptation of the system model, the method 200 returns to the step 230 and, on the basis of the adapted system model, newly calculates the lambda value downstream of the catalytic converter 130. The adaptation 250 of the system model is in this case preferably performed, in terms of the degree thereof, in a manner corresponding to the absolute value of the deviation between modeled and measured lambda values. A deviation which is large in terms of absolute value accordingly gives rise to a large adaptation, and a small deviation gives rise to a correspondingly small adaptation. In particular, the adaptation requirement is a function of the difference between the measured lambda value and the calculated lambda value downstream of the catalytic converter 130.

In a step 260, the degree of the adaptation(s) 250, and the frequency thereof, in particular normalized with respect to the volume flow of the exhaust gas, is detected and evaluated. For this purpose, it is ascertained in particular whether the adaptation requirement (both absolute value and frequency) has changed over time or in relation to the volume flow.

In order to identify exceptionally large or exceptionally frequent changes in the adaptation requirement, the adaptation requirement is for example detected numerically and differentiated (in particular numerically), and the absolute value of the derivative of the adaptation requirement is integrated over the observation period. The derivative and consequently also the integral of the absolute value of the derivative of the adaptation requirement are 0 if the adaptation requirement does not change (that is to say is constant) during the observation period. The more frequently, or the greater the degree to which, the adaptation requirement changes, the higher the values that the integral will assume. An inadmissible drop in the conversion capability of the catalytic converter can thus be assumed to be present in particular if the integral exceeds a predetermined threshold value.

In a step 270, it is therefore correspondingly ascertained whether said change in the adaptation requirement exceeds the predetermined threshold value. If the threshold value has been exceeded, the state of the catalytic converter 130 is, in a step 280, indicated as being critical. In the step 280, for this purpose, it is preferably the case that a warning message is triggered, for example in the form of an actuation of a warning lamp, an outputting of a warning tone, or an outputting of a speech or text message.

By contrast, if it is identified in step 270 that the predetermined threshold value has not been exceeded with regard to the change in the degree or the frequency of the adaptation requirement, the method 200 returns to the initialization step 210 or to the measurement 220 and modeling 230 of the respective first and second lambda values.

The invention claimed is:

1. A method (200) for ascertaining a catalytic converter state, the method comprising:
    monitoring, via one or more sensors (145, 147) and a computer, an exhaust-gas catalytic converter (130) based on a catalytic converter model, wherein the catalytic converter model is adapted (250) in a manner dependent on measured values detected by means of the one or more sensors (145, 147),
    detecting (260), via the computer, a frequency, a degree, or a frequency and degree of the adaptation of the catalytic converter model,
    determining (270), via the computer, the catalytic converter state as non-critical when the frequency and/or the degree of the adaptation do not exceed a predetermined threshold value,
    determining (270), via the computer, the catalytic converter state as critical when the frequency and/or the degree of the adaptation exceed the predeterminable threshold value, and
    outputting (280), via an output device, an indication indicative of the catalytic converter state being critical,
    wherein, from the detected adaptations of the catalytic converter model, an adaptation requirement function is ascertained, the adaptation requirement function is differentiated, the absolute value of the derivative is integrated, and the integral of the derivative absolute value of the adaptation requirement function is used as the frequency and/or the degree of the adaptation of the catalytic converter model.

2. The method (200) according to claim 1, wherein the detected measured values are lambda values upstream and/or downstream of the catalytic converter.

3. The method (200) according to claim 1, wherein the frequency and/or the degree of the adaptation of the catalytic converter model are based on a predetermined exhaust-gas flow rate.

4. The method (200) according to claim 1, wherein the adaptation requirement function is a function of a difference between at least one of the detected measured values and at least one model value determined by means of the catalytic converter model.

5. The method (200) according to claim 1, wherein the catalytic converter (130) has a storage capacity for at least one exhaust-gas component and the catalytic converter model is used at least for performing closed-loop control of a fill level of the catalytic converter (130) with respect to said at least one exhaust-gas component.

6. The method (200) according to claim 1, wherein the catalytic converter state comprises a conversion capability of the catalytic converter (130).

7. The method (200) according to claim 1, wherein the exhaust-gas catalytic converter (130) is arranged in an exhaust-gas aftertreatment system of a vehicle (100).

8. A processing unit (140) comprising at least one computer configured to
monitor an exhaust-gas catalytic converter (130) based on a catalytic converter model, wherein the catalytic converter model is adapted (250) in a manner dependent on measured values detected by means of one or more sensors (145, 147),
detect (260) a frequency, a degree, or a frequency and degree of the adaptation of the catalytic converter model,
determine (270) the catalytic converter state as non-critical when the frequency and/or the degree of the adaptation do not exceed a predetermined threshold value,
determine (270) the catalytic converter state as critical when the frequency and/or the degree of the adaptation exceed the predeterminable threshold value, and
outputting (280), with an output device, an indication indicative of the catalytic converter state being critical,
wherein, from the detected adaptations of the catalytic converter model, an adaptation requirement function is ascertained, the adaptation requirement function is differentiated, the absolute value of the derivative is integrated, and the integral of the derivative absolute value of the adaptation requirement function is used as the frequency and/or the degree of the adaptation of the catalytic converter model.

9. A non-transitory, computer-readable medium containing instructions that when executed by a computer cause the computer to
monitor an exhaust-gas catalytic converter (130) based on a catalytic converter model, wherein the catalytic converter model is adapted (250) in a manner dependent on measured values detected by means of one or more sensors (145, 147),
detect (260) a frequency, a degree, or a frequency and degree of the adaptation of the catalytic converter model,
determine (270) the catalytic converter state as non-critical when the frequency and/or the degree of the adaptation do not exceed a predetermined threshold value,
determine (270) the catalytic converter state as critical when the frequency and/or the degree of the adaptation exceed the predeterminable threshold value, and
outputting (280), with an output device, an indication indicative of the catalytic converter state being critical,
wherein, from the detected adaptations of the catalytic converter model, an adaptation requirement function is ascertained, the adaptation requirement function is differentiated, the absolute value of the derivative is integrated, and the integral of the derivative absolute value of the adaptation requirement function is used as the frequency and/or the degree of the adaptation of the catalytic converter model.

* * * * *